United States Patent
Fischl et al.

(10) Patent No.: US 11,111,974 B2
(45) Date of Patent: Sep. 7, 2021

(54) BRAKE CARRIER AND DISC BRAKE

(71) Applicant: KNORR-BREMSE Systeme fuer Nutzfahrzeuge GmbH, Munich (DE)

(72) Inventors: Tobias Fischl, Munich (DE); Josef Schropp, Eichendorf (DE); Andreas Petschke, Neuburg am Inn (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 59 days.

(21) Appl. No.: 16/570,465

(22) Filed: Sep. 13, 2019

(65) Prior Publication Data
US 2020/0003266 A1 Jan. 2, 2020

Related U.S. Application Data

(63) Continuation of application No. PCT/EP2018/056020, filed on Mar. 12, 2018.

(30) Foreign Application Priority Data

Mar. 16, 2017 (DE) ..................... 10 2017 105 641.6

(51) Int. Cl.
*F16D 55/226* (2006.01)
*B60T 1/06* (2006.01)
(Continued)

(52) U.S. Cl.
CPC .......... *F16D 55/2262* (2013.01); *B60T 1/065* (2013.01); *F16D 65/0056* (2013.01);
(Continued)

(58) Field of Classification Search
CPC ............. F16D 55/2262; F16D 65/0068; F16D 65/0056; F16D 2055/0016; F16D 65/095;
(Continued)

(56) References Cited

U.S. PATENT DOCUMENTS 4,552,253 A    11/1985 Burgdorf et al.
7,513,340 B2*  4/2009 Hendrich ............ F16D 65/0972
                                          188/73.36
(Continued)

FOREIGN PATENT DOCUMENTS

CN    1712750 A    12/2005
CN    103797264 A   5/2014
(Continued)

OTHER PUBLICATIONS

International Search Report (PCT/ISA/210) issued in PCT Application No. PCT/EP2018/056020 dated Jun. 20, 2018 with English translation (five pages).
(Continued)

*Primary Examiner* — Pamela Rodriguez
(74) *Attorney, Agent, or Firm* — Crowell & Moring LLP

(57) ABSTRACT

A brake carrier for a disc brake of a commercial vehicle has an attachment region for fixing on a vehicle axis and at least one pad shaft for receiving and supporting at least one brake pad. The pad shaft is formed by way of an inlet-side carrier horn, an outlet-side carrier horn and a bridge which connects the inlet-side carrier horn and the outlet-side carrier horn. Regions of the bridge which adjoin the carrier horns form bearing surfaces for radially supporting the at least one brake pad. The respective guide contours for guiding the brake pad into a push-in position are arranged to the side of the pad shaft on a side surface of the carrier horns, in which push-in position the brake pad can be pushed axially with respect to the vehicle axle into the pad shaft between the carrier horns.

10 Claims, 4 Drawing Sheets

(51) Int. Cl.
| | |
|---|---|
| *F16D 65/00* | (2006.01) |
| *F16D 65/095* | (2006.01) |
| *F16D 55/00* | (2006.01) |
| *F16D 121/02* | (2012.01) |
| *F16D 121/24* | (2012.01) |

(52) U.S. Cl.
CPC ..... *F16D 65/0068* (2013.01); *F16D 65/0087* (2013.01); *F16D 65/095* (2013.01); *F16D 2055/007* (2013.01); *F16D 2055/0008* (2013.01); *F16D 2055/0016* (2013.01); *F16D 2121/02* (2013.01); *F16D 2121/24* (2013.01)

(58) Field of Classification Search
CPC ............. F16D 65/0087; F16D 65/0093; F16D 2055/0008; F16D 2055/007; F16D 2121/02; F16D 2121/24; B60T 1/065
See application file for complete search history.

(56) References Cited

U.S. PATENT DOCUMENTS

| | | | |
|---|---|---|---|
| 7,926,631 B2* | 4/2011 | Roberts | F16D 55/2265 |
| | | | 188/250 B |
| 8,544,614 B1 | 10/2013 | Plantan et al. | |
| 8,973,720 B2* | 3/2015 | Plantan | F16D 65/183 |
| | | | 188/73.32 |
| 10,036,437 B2* | 7/2018 | Schoenauer | F16D 65/0976 |
| 10,036,438 B2 | 7/2018 | Gasslbauer | |
| 10,125,832 B2* | 11/2018 | Schropp | F16D 65/0056 |
| 2003/0085083 A1 | 5/2003 | Baumgartner et al. | |
| 2004/0222050 A1 | 11/2004 | Beringer | |
| 2005/0284710 A1 | 12/2005 | Roberts et al. | |
| 2008/0067015 A1* | 3/2008 | Thomas | F16D 55/00 |
| | | | 188/73.31 |
| 2012/0085597 A1* | 4/2012 | Narayanan, V | F16D 65/092 |
| | | | 188/72.1 |
| 2014/0196992 A1 | 7/2014 | Iraschko | |
| 2014/0345983 A1 | 11/2014 | Baumgartner et al. | |
| 2015/0001011 A1 | 1/2015 | Zhang et al. | |
| 2016/0185323 A1 | 6/2016 | Kaneko et al. | |

FOREIGN PATENT DOCUMENTS

| | | |
|---|---|---|
| CN | 104105900 A | 10/2014 |
| CN | 104251271 A | 12/2014 |
| CN | 104583633 A | 4/2015 |
| CN | 105452700 A | 3/2016 |
| CN | 105736604 A | 7/2016 |
| DE | 2 211 013 A | 9/1973 |
| DE | 32 23 627 A1 | 12/1983 |
| DE | 100 18 523 A1 | 10/2001 |
| DE | 696 26 573 T2 | 4/2004 |
| DE | 10 2015 114 351 A1 | 3/2017 |
| EP | 0 752 541 B1 | 3/2003 |
| KR | 10-2015-0091859 A | 8/2015 |
| WO | WO 2015/050638 A1 | 4/2015 |

OTHER PUBLICATIONS

German-language Written Opinion (PCT/ISA/237) issued in PCT Application No. PCT/EP2018/056020 dated Jun. 20, 2018 (five pages).

German-language Office Action issued in counterpart German Application No. 10 2017 105 641.6 dated Nov. 8, 2017 (seven pages).

Chinese-language Office Action issued in Chinese Application No. 201880018474.5 dated Apr. 9, 2020 with English translation (11 pages).

* cited by examiner

BRAKE CARRIER AND DISC BRAKE

CROSS REFERENCE TO RELATED APPLICATIONS

This application is a continuation of PCT International Application No. PCT/EP2018/056020, filed Mar. 12, 2018, which claims priority under 35 U.S.C. § 119 from German Patent Application No. 10 2017 105 641.6, filed Mar. 16, 2017, the entire disclosures of which are herein expressly incorporated by reference.

BACKGROUND AND SUMMARY OF THE INVENTION

The present invention relates to a brake carrier for a disc brake of a commercial vehicle which can be actuated pneumatically or by an electromotor, and to a disc brake having said brake carrier.

Generic brake carriers for disc brakes of commercial vehicles which can be actuated pneumatically or by an electromotor essentially have a connection region for fastening to a vehicle axle, for example by being screwed to an axle flange of such a vehicle axle, and a brake pad shaft for receiving and supporting at least one brake pad. The brake pad shaft is here formed by a bridge having bearing surfaces for radially supporting the brake pad and carrier horns projecting therefrom, wherein the carrier horns guide the respective brake pad laterally and absorb the braking forces which are transferred from a brake disc to the brake pad during a braking procedure. Brake carriers which overlap the brake disc and have two brake pad shafts for receiving an application-side brake pad and a reaction-side brake pad are also known.

An application-side brake pad is defined as the brake pad which is driven directly by thrust members of a brake application unit of the disc brake. A reaction-side brake pad is defined as the brake pad which is pressed against the reaction-side friction surface of the brake disc after the application-side brake pad is pressed against the brake disc by movement of the brake caliper.

In order to fit a brake pad in such a brake pad shaft of a brake carrier, the brake pad is inserted into the brake pad shaft radially with respect to the axis of rotation of the brake disc, along the inner surfaces of the carrier horns. If the carrier horns have a flat design and the geometry of the brake pad shaft is essentially rectangular, it is consequently possible for the brake pad to be inserted very easily directly into the brake pad shaft from above through the brake pad shaft opening of a brake caliper of the disc brake.

However, such an arrangement necessitates an additional retaining or securing system for the brake pad or pads, in particular for the purpose of radially fixing the brake pads in order to secure them from falling out, for example in the form of a pad retaining bracket which overlaps the brake pad shaft opening of the brake caliper in the direction of the axis of rotation of the brake disc.

In the case of a brake carrier in which the carrier horns are configured in such a way that the brake pads are fixed radially positively on both of the carrier horns, the brake pads must first be moved axially in the direction of the vehicle axle, parallel to the brake pad shaft, until respective projections on the side walls of the brake pads and corresponding recesses on the insides of the carrier horns of the brake carrier line up with one another such that the brake pad reaches a push-in position in which the brake pad can then be pushed in the direction of the axis of rotation of the brake disc, into the brake pad shaft. Such a brake carrier is known, for example, from DE 10 2015 114 351 A1.

A problem with the fitting in particular of the application-side brake pad covered by the disc brake is the ability to perform the positioning of the brake pads as easily and quickly as possible during the installation process.

The object of the present invention is to provide a brake carrier and a disc brake by means of which the installation of brake pads is further simplified.

This object is achieved by a brake carrier and by a disc brake according to the claimed invention.

The brake carrier according to the invention for a disc brake of a commercial vehicle which can be actuated pneumatically or by an electromotor has a connection region for fastening to a vehicle axle, and at least one brake pad shaft for receiving and supporting at least one brake pad.

The brake pad shaft is formed by an inlet-side carrier horn, an outlet-side carrier horn, and a bridge connecting the inlet-side carrier horn and the outlet-side carrier horn. Regions of the bridge which adjoin the carrier horns thus form bearing surfaces for radially supporting the brake pad.

Respective guide contours for guiding the brake pad into a push-in position to the side of the brake pad shaft are arranged on a side face of the carrier horns, in which position the brake pad can be pushed axially with respect to the vehicle axle into the brake pad shaft between the carrier horns.

Easier orientation of a brake pad which is to be inserted into the brake pad shaft of the brake carrier is enabled by means of such a brake carrier because a precisely central positioning of the brake pad is forced by the guide contour.

If, when pushed in radially, the brake pad is initially positioned so that it is displaced laterally, a side edge of a brake carrier plate of the brake pad abuts the guide contour and is guided along the guide contour into its correct push-in position.

According to an advantageous alternative embodiment of the brake carrier according to the invention, the bearing surfaces for radially supporting the at least one brake pad are enlarged laterally by a mounting region for limiting the sliding movement of the brake pad into the push-in position to the side of the brake pad shaft. In a simple fashion, this enables the brake pad to be pushed into the push-in position in which the brake pad can be can be slid forward in the brake pad shaft, parallel to the axis of rotation of the brake disc.

According to a preferred alternative embodiment of the invention, the guide contours are integrally formed, as thickened material of the carrier horns, on the side faces of the carrier horns. The guide contours can thus easily be integrally formed on the carrier horns during the casting process of the brake carrier.

The guide contours are here preferably formed in such a way that they are formed so that they approach each other the closer they are to the bridge.

The guide contours particularly preferably each have at least one rectilinear guide region which makes it possible for the respective brake pad to be guided into the precise central position in the event of it being initially displaced laterally.

In the case of a brake carrier in which projections are integrally formed on respective inner sides of the carrier horns and serve to radially secure the brake pad with a correspondingly formed brake pad carrier plate with lateral recesses, in each case one socket for receiving a respective projection of the brake pad carrier plate is preferably integrally formed below the projections, wherein the guide contours each end at a side edge of the respective socket.

As a result, the brake pad can be guided along one of the guide contours, at all times into the correct push-in position.

The disc brake according to the invention has a displaceable brake caliper which extends over a brake disc, and brake pads, with a brake pad carrier plate and a friction pad fastened thereto, which are arranged on either side of the brake disc in a brake pad shaft of a brake carrier.

On the inlet side and the outlet side, radially with respect to the axis of rotation of the brake disc, the brake pads are retained positively on carrier horns of the brake carrier, wherein the brake carrier is configured as described above.

Preferably, solely the application-side carrier horns have the guide contours for guiding the brake pad into a push-in position, to the side of the brake pad shaft.

In particular when fitting the application-side brake pads, as a rule precise orientation is made difficult by the brake disc obstructing visibility such that the guide contours according to the invention here make fitting considerably easier.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the drawings, terms such as upper, lower, left, right, front, rear, etc refer exclusively to the view and position of the brake carrier, the brake pad, the carrier horn, the bridge, the guide contour and the like which are given by way of example in the respective drawings. These terms should not be considered as limiting, i.e. these references can change as a result of different working positions or the mirror-symmetrical design or the like.

Figure 1:
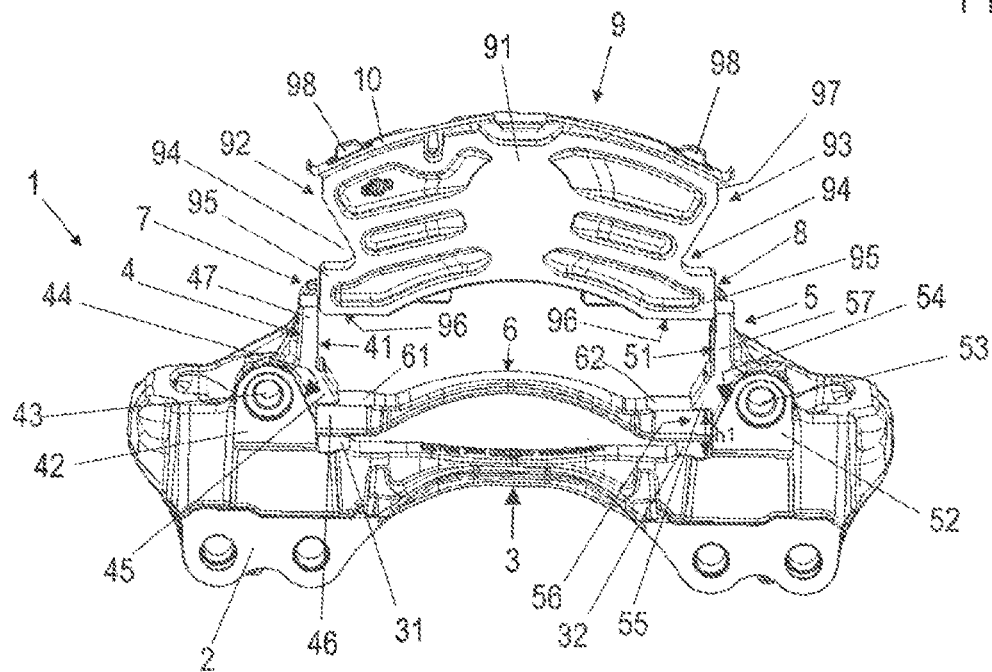
FIG. 1 is a perspective view of a first alternative embodiment of a brake carrier according to the invention and a brake pad prior to fitting.

A brake carrier for a disc brake of a commercial vehicle which can be actuated pneumatically or by an electromotor is labelled by the reference numeral 1 in FIG. 1.

The brake carrier 1 has a connection region 2 which serves for fastening to a vehicle axle, for example by being screwed to an axle flange of a vehicle axle of the commercial vehicle.

A brake pad shaft, which serves to receive and support at least one brake pad 9, is integrally formed above the connection region 2.

The brake carrier 1 shown here thus has two such brake pad shafts. The brake carrier 1 is thus designed such that it overlaps a brake disc (not shown) of the disc brake and thus a brake pad shaft for receiving a brake pad 9 is integrally formed in each case on both sides of the brake disc.

Each of the brake pad shafts is here formed by an inlet-side carrier horn 4, 7, an outlet-side carrier horn 5, 8, and a bridge 3, 6 connecting the inlet-side carrier horn 4, 7 to the outlet-side carrier horn 5, 8.

The carrier horns 4, 5 and the bridge 3 here define the application side. An inlet-side carrier horn 7, an outlet-side carrier horn 8, and a bridge 5 are correspondingly integrally formed on the reaction side of the brake carrier 1.

The design of the brake pad shaft on the application side will be described in detail in the following description.

The brake pad shaft of the reaction side can here have the same design. It is, however, also contemplated to design the reaction-side brake pad shaft at least slightly differently from the application-side brake pad shaft.

The regions of the bridge 3 which adjoin the carrier horns 4, 5 form bearing surfaces 31, 32 which serve to radially support the brake pad 9, wherein an underside 96 of the brake pad bears against the bearing surfaces 31, 32 in the pushed-in state. The bridge 6 of the reaction side of the brake carrier 1 also has such bearing surfaces 61, 62.

A brake pad retaining spring 10 is preferably retained on the upper side of the brake pad 9 opposite the underside 96. The brake pad retaining spring 10 is here preferably fixed to retaining lugs 98 on the outer edges of the upper side of a brake pad carrier plate 91 of the brake pad 9.

The carrier horns 4, 5 each have an inner side 41, 51, facing the brake pad, against which, when the brake pad has been fitted, at least portions of side faces 92, 93 of the brake pad carrier plate 91 of the brake pad 9 are supported, like the bearing surfaces 97 shown in FIG. 1.

Respective guide contours 44, 54, which serve to guide the brake pad 9 into a push-in position to the side of the brake pad shaft, are arranged on a side face 42, 52 of the carrier horns 4, 5 which faces away from the brake disc. The push-in position is here defined as the position in which the brake pad 9 can be pushed axially with respect to the vehicle axle or the axis of rotation (not shown) of the brake disc, into the brake pad shaft between the carrier horns 4, 5.

As shown in FIGS. 2 to 5, these guide contours 44, 54 are preferably intergrally formed, as thickened material of the carrier horns 4, 5, on the side faces 42, 52 of the carrier horns 4, 5.

Figure 3:
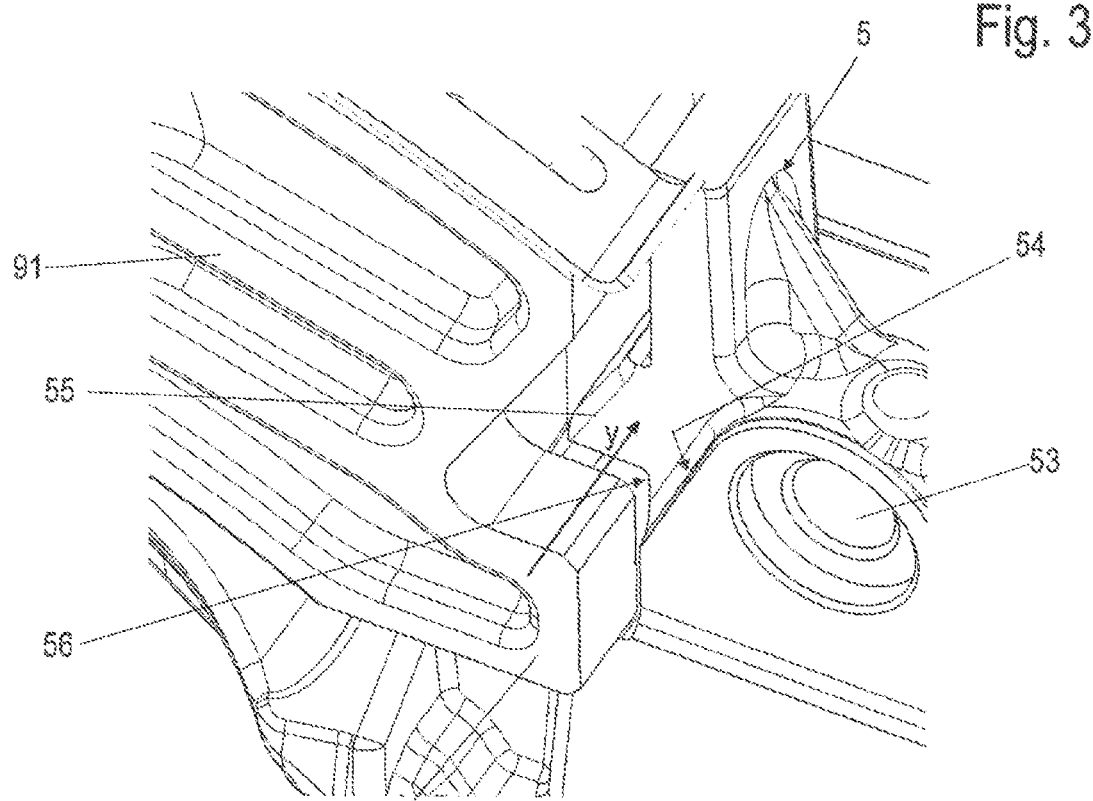
FIG. 3 is a perspective view in detail of the brake pad and the brake carrier from FIG. 1 with a brake pad pushed in completely radially prior to being displaced axially into the brake pad shaft.

It is consequently made possible for a brake pad carrier plate 91, which is guided in a radial direction (in the direction z of the axis of rotation of the brake disc) along a side face 47, 57 of an upright of the carrier horn 4, 5 and is not moved precisely but offset radially when inserted radially, abuts the guide contour 44, 54 with an under edge when moved radially in the direction z and is guided along it into its centered position until the brake pad 9 is, as shown in FIG. 3, positioned on a mounting region 33.

The mounting region 33 defines an additional bearing surface of the respective bearing surfaces 31, 32 of those regions of the bridge 3 which adjoin the carrier horns 4, 5 and is provided to prevent displacement of the brake pad 9 past the brake pad shaft too far in the direction of the axis of rotation of the brake disc.

Instead of the guide contours 44, 54 being integrally formed on the side faces of the carrier horns 4, 5, it is however in principle also contemplated to fasten these guide contours 44, 54 on the respective carrier horn as separate, for example plate-like components.

The application-side side faces 42, 52 of the carrier horns 4, 5 furthermore have receiving bores 43, 53 which serve to mount a brake caliper (not shown) in sliding fashion.

As shown in FIGS. 1-5, the guide contours 44, 54 of the carrier horns 4, 5 of a brake pad shaft are formed so that they approach each other toward the bridge 3.

Figure 2:
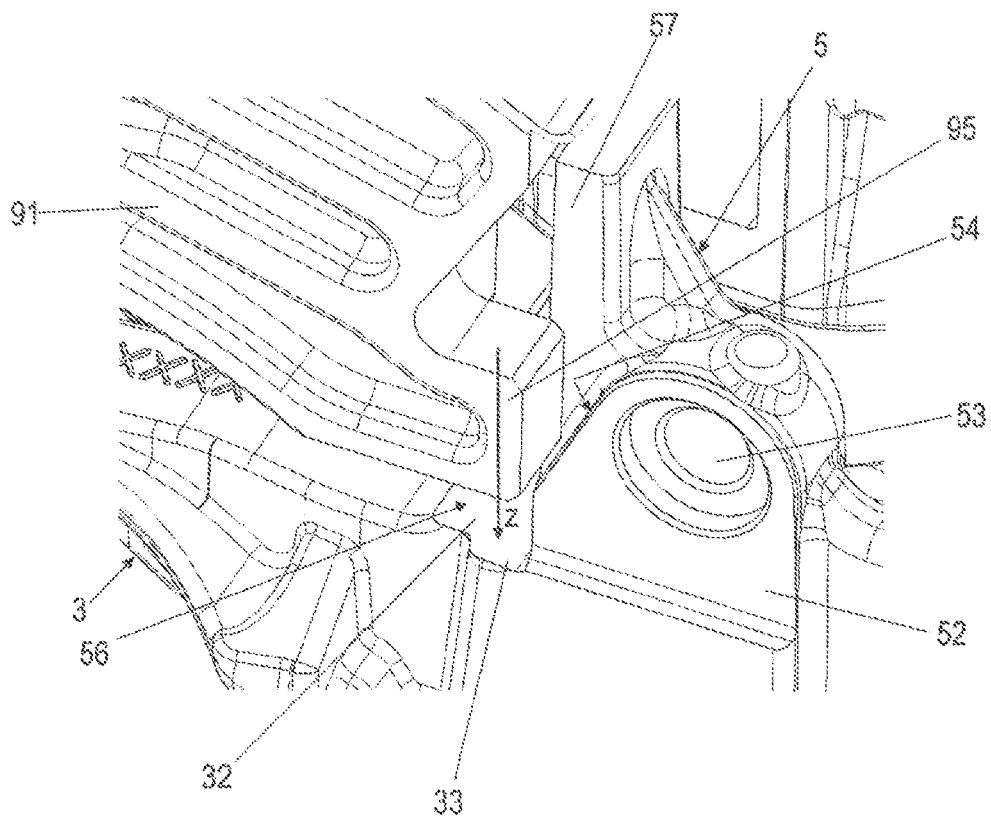
FIG. 2 is a perspective view in detail of the brake carrier from FIG. 1 with a brake pad pushed in partially radially.
Figure 4:
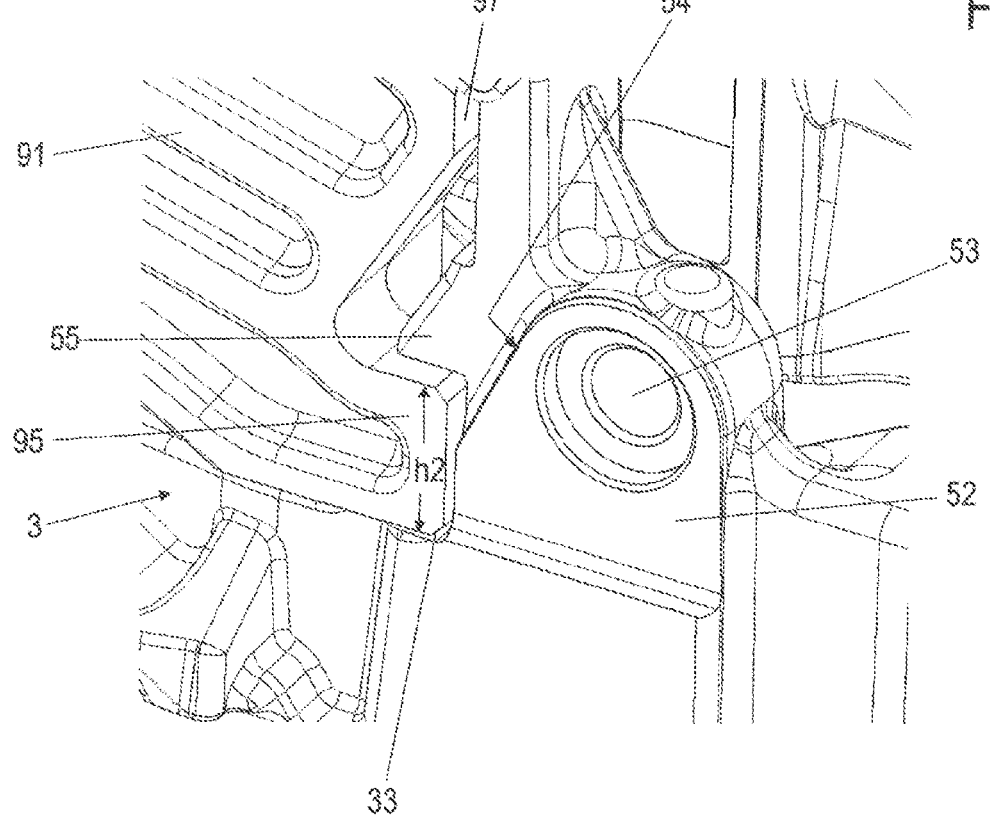
FIG. 4 is a view corresponding to FIG. 3 with a brake pad pushed into the brake pad shaft.
Figure 5:
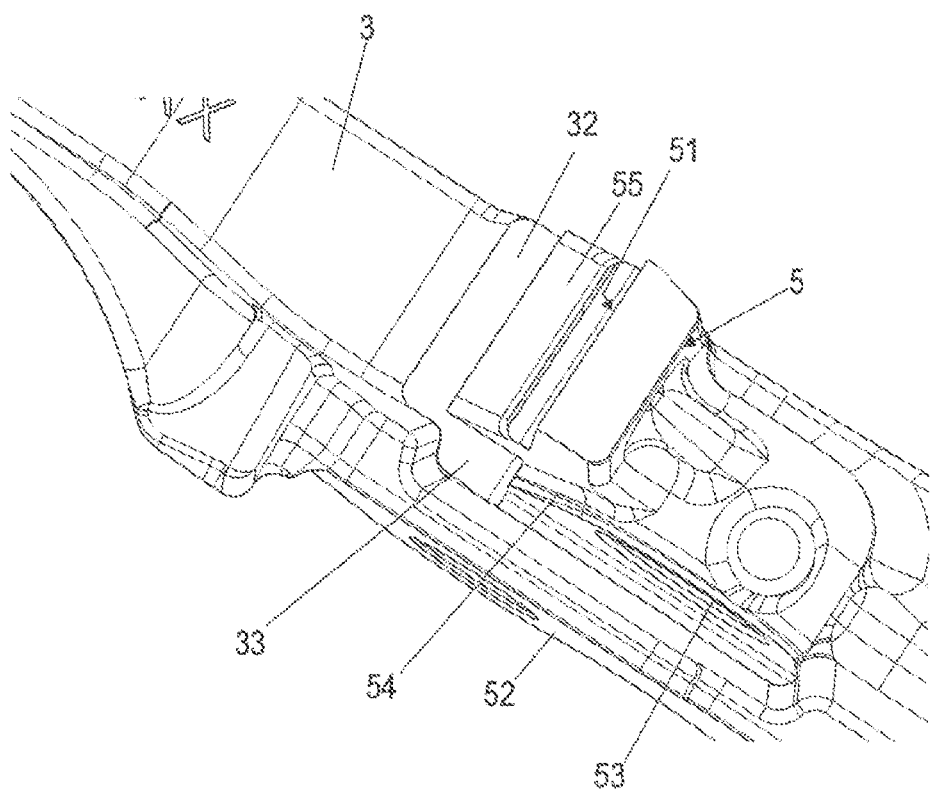
FIG. 5 is a plan view of the brake carrier from FIG. 1.

As can be seen particularly well in FIGS. 2-4, the guide contours 44, 54 have two rectilinear regions at an angle to each other.

A first rectilinear region is here oriented at an angle to the push-in direction z and serves to guide the brake pad 9 into its central position between the carrier horns 4, 5.

A second rectilinear region is oriented radially, i.e. in the push-in direction z, so that, after it reaches the mounting region 33, the brake pad 9 can be pushed axially with respect to the axis of rotation of the brake disc in a push-in direction y between the carrier horns 4, 5.

In the alternative embodiment of the brake carrier 1 shown in FIGS. 1-5, projections 45, 55, which serve to radially secure the brake pad 9 with a correspondingly formed brake pad carrier plate 91 with lateral recesses 94, are integrally formed on respective inner sides 41, 51 of the carrier horns 4, 5.

In each case one socket 46, 56 for receiving a respective projection 95 of the brake pad carrier plate 91 is integrally formed below the projections 45, 55 of the carrier horns 4, 5, wherein the guide contours 44, 54 each end at a side edge of the respective socket 46, 56. The height $h_2$ of the projections 95 here preferably corresponds to the height $h_1$ of the sockets 46, 56 of the carrier horns 4, 5 such that the brake pad is fixed radially in the sockets 46, 56.

Figure 6:
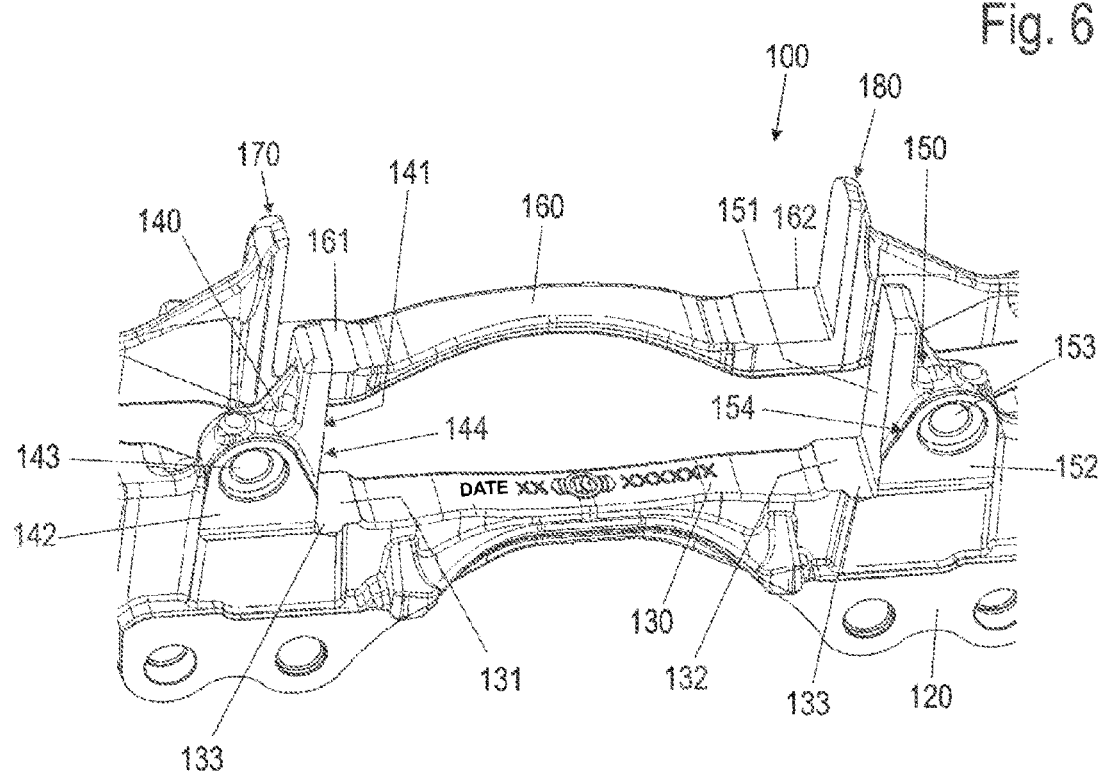
FIG. 6 is a perspective view of an alternative embodiment of a brake carrier.
Figure 7:
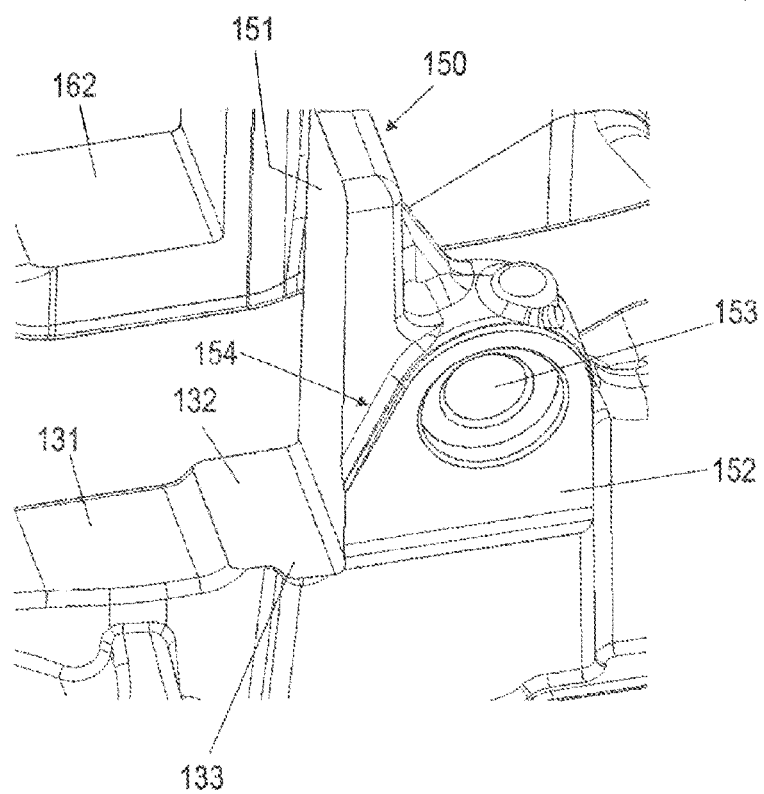
FIG. 7 is a perspective view in detail of the brake carrier from FIG. 6.

In the alternative embodiments of a brake carrier 100 shown in FIGS. 6 and 7, the guide contours 144, 154 have the same design as the above described brake carrier 1.

The essential difference of this brake carrier 100 from the brake carrier 1 described above are the rectilinear inner faces 141, 151 of the carrier horns 140, 150 such that, in the case of a brake carrier 100 designed in such a way, in addition to direct insertion of the brake pad 9 between the carrier horns 140, 150, laterally offset pushing-in of the brake pad 9 is also readily possible because the precise central orientation of the brake pad 9 is simplified here too by the guide contours 144, 154 and the mounting region 133 on the bearing surfaces 131, 132 of the bridge 130.

In the alternative embodiment shown here, the brake carrier 100 is also designed such that it overlaps a brake disc (not shown) such that the carrier horns 140, 150 and the bridge 130 form an application-side brake pad shaft and the carrier horns 170, 180 and the bridge 160 form a reaction-side brake pad shaft.

Particularly preferably, only the application-side carrier horns 4, 5, 140, 150 are formed with such guide contours 44, 54, 144, 154 for guiding a brake pad 9 in a push-in position, to the side of the brake pad shaft.

The reaction-side carrier horns 7, 8, 170, 180 are preferably designed without such guide contours. The bearing surfaces 61, 62, 161, 162 of the reaction-side bridges 6, 160 are likewise designed such that their width in the direction of the axis of rotation of the brake disc corresponds to the width of the carrier horns 7, 8, 170, 180.

LIST OF REFERENCE NUMERALS 1 brake carrier
2 connection region
3 bridge
31 bearing surface
32 bearing surface
33 mounting region
4 carrier horn
41 inner side
42 side face
43 receiving bore
44 guide contour
45 projection
46 socket
5 carrier horn
51 inner side
52 side face
53 receiving bore
54 guide contour
55 projection
56 socket
6 bridge
61 bearing surface
62 bearing surface
7 carrier horn
8 carrier horn
9 brake pad
91 brake pad carrier plate
92 side face
93 side face
94 recess
95 projection
96 under edge
97 bearing surface
98 retaining lug
10 brake pad retaining spring
100 brake carrier
120 connection region
130 bridge
131 bearing surface
132 bearing surface
133 mounting region
140 carrier horn
141 inner side
142 side face
143 receiving bore
144 guide contour
150 carrier horn
151 inner side
152 side face
153 receiving bore
154 guide contour
160 bridge
161 bearing surface
162 bearing surface
170 carrier horn
180 carrier horn
h1 height of the projection
h2 height of the recess The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A brake carrier for a disc brake of a commercial vehicle which is actuatable pneumatically or by an electromotor, comprising:
a connection region for fastening to a vehicle axle;

at least one brake pad shaft for receiving and supporting at least one brake pad, wherein the brake pad shaft is formed by an inlet-side carrier horn, an outlet-side carrier horn, and a bridge connecting the inlet-side carrier horn and the outlet-side carrier horn, regions of the bridge which adjoin the carrier horns form bearing surfaces for radially supporting the at least one brake pad, respective guide contours for guiding the brake pad into a push-in position at a side of the brake pad shaft are arranged adjacent to a side face of the carrier horns, in which position the brake pad is pushable axially with respect to the vehicle axle into the brake pad shaft between the carrier horns, and the guide contours are formed so as to approach each other closer to the bridge.

2. The brake carrier according to claim 1, wherein the bearing surfaces for radially supporting the at least one brake pad are enlarged laterally to the side of the brake pad shaft by a mounting region for limiting the sliding movement of the brake pad into the push-in position.

3. The brake carrier according to claim 2, wherein the guide contours are integrally formed, as thickened material of the carrier horns, adjacent to the side faces of the carrier horns.

4. The brake carrier according to claim 1, wherein the guide contours are integrally formed, as thickened material of the carrier horns, adjacent to the side faces of the carrier horns.

5. The brake carrier according to claim 1, wherein the guide contours each have at least one rectilinear guide region.

6. The brake carrier according to claim 5, wherein a first rectilinear guide region is oriented at an angle to the plane of an inner side of the carrier horns, and a second rectilinear guide region lies within the plane of the inner side of the respective carrier horn.

7. The brake carrier according to claim 1, wherein projections, for radially securing the brake pad with a correspondingly formed brake pad carrier plate with lateral recesses, are integrally formed on respective inner sides of the carrier horns.

8. The brake carrier according to claim 7, wherein in each case one socket for receiving a respective projection of the brake pad carrier plate is integrally formed below the projections, wherein the guide contours each end at a side edge of the respective socket.

9. A disc brake of a commercial vehicle which is actuatable pneumatically or by an electromotor, comprising:

a displaceable brake caliper which overlaps a brake disc;

a brake carrier; and brake pads, each having a brake pad carrier plate and a friction pad fastened thereto, which are arranged on either side of the brake disc in the brake carrier, wherein on an inlet side and an outlet side, radially with respect to an axis of rotation of the brake disc, the brake pads are retained positively on carrier horns of the brake carrier, wherein the brake carrier comprises:

a connection region for fastening to a vehicle axle;

at least one brake pad shaft for receiving and supporting at least one of the brake pads, wherein the at least one brake pad shaft is formed by an inlet-side carrier horn, an outlet-side carrier horn, and a bridge connecting the inlet-side carrier horn and the outlet-side carrier horn, regions of the bridge which adjoin the carrier horns form bearing surfaces for radially supporting the at least one brake pad, and respective guide contours for guiding the at least one brake pad into a push-in position at a side of the brake pad shaft are arranged adjacent to a side face of the carrier horns, in which position the at least one brake pad is pushable axially with respect to the vehicle axle into the brake pad shaft between the carrier horns, and the guide contours are formed so as to approach each other closer to the bridge.

10. The disc brake according to claim 9, wherein only action-side carrier horns have the guide contours for guiding the at least one brake pad into a push-in position, to the side of the brake pad shaft.

* * * * *